US009323352B1

(12) United States Patent
Haskin et al.

(10) Patent No.: US 9,323,352 B1
(45) Date of Patent: Apr. 26, 2016

(54) CHILD-APPROPRIATE INTERFACE SELECTION USING HAND RECOGNITION

(71) Applicant: Amazon Technologies, Inc., Seattle, WA (US)

(72) Inventors: Menashe Haskin, Palo Alto, CA (US); Deborah May Shepard, Portola Valley, CA (US)

(73) Assignee: Amazon Technologies, Inc., Seattle, WA (US)

( * ) Notice: Subject to any disclaimer, the term of this patent is extended or adjusted under 35 U.S.C. 154(b) by 344 days.

(21) Appl. No.: 13/658,718

(22) Filed: Oct. 23, 2012

(51) Int. Cl.
| | |
|---|---|
| *G09G 5/08* | (2006.01) |
| *G06F 3/0346* | (2013.01) |
| *G06F 3/03* | (2006.01) |
| *G06F 3/01* | (2006.01) |
| *G06F 3/0354* | (2013.01) |
| *G06F 3/048* | (2013.01) |
| *G06F 3/0488* | (2013.01) |
| *G06F 3/0484* | (2013.01) |
| *G06F 3/0482* | (2013.01) |
| *G03B 21/14* | (2006.01) |
| *G06K 9/32* | (2006.01) |

(52) U.S. Cl.
CPC ............ *G06F 3/0346* (2013.01); *G03B 21/142* (2013.01); *G06F 3/017* (2013.01); *G06F 3/0304* (2013.01); *G06F 3/03547* (2013.01); *G06F 3/048* (2013.01); *G06F 3/0482* (2013.01); *G06F 3/0484* (2013.01); *G06F 3/0488* (2013.01); *G06K 9/3241* (2013.01)

(58) Field of Classification Search
USPC ............................ 345/158; 382/103; 715/700
See application file for complete search history.

(56) References Cited

U.S. PATENT DOCUMENTS

| | | | |
|---|---|---|---|
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 2007/0271512 A1* | 11/2007 | Knight et al. | 715/700 |
| 2008/0276186 A1* | 11/2008 | Feduszczak et al. | 715/762 |
| 2010/0166258 A1* | 7/2010 | Chai et al. | 382/103 |
| 2012/0223885 A1 | 9/2012 | Perez | |
| 2013/0293679 A1* | 11/2013 | Gurman et al. | 348/46 |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Jason Olson
*Assistant Examiner* — Sosina Abebe
(74) *Attorney, Agent, or Firm* — Lee & Hayes, PLLC

(57) ABSTRACT

Hand recognition is used to distinguish among users of gesture-based computer systems, and particularly between adults and children. Hands may be classified as adults or children based on certain physical characteristics, such as hand size, shape, or curvature. Depending upon whether the hand belongs to an adult or a child, user-appropriate interfaces are provided. For instance, in response to detecting a presence of a child, the interface may include more child-appropriate features such as simpler graphical elements, use of basic audio interfaces, and so forth.

23 Claims, 7 Drawing Sheets

CHILD-APPROPRIATE INTERFACE SELECTION USING HAND RECOGNITION

BACKGROUND

User interfaces have traditionally relied on input devices such as keyboards, which require physical manipulation by a user. Increasingly, however, it is desired to detect and monitor the physical positions and movements of users within a scene or environment. User motions and gestures can be used in some environments as user commands and inputs to automated systems. In particular, hand gestures may be useful in providing input from a user to a computerized system.

As gesture-based computerized systems become more pervasive in home and public use, one challenge is an increased likelihood of false positives where users unsuspectingly and unintentionally initiate actions. This may result in presentation of content that is not intended for the audience. For example, suppose a child walking through a room unsuspectingly begins interacting with a parent's gesture-based computerized system and the computerized system presents the parent's work content. Through continued gesture interaction, which may be playful movement, the child may unintentionally disrupt his parent's work product or gain access to content that is unintended for consumption by the child.

Accordingly, there is a need to improve ways to differentiate among adults and children in environments where gesture-based computer systems are used.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are systems and techniques that facilitate human-to-machine interaction through use of hand gestures. More particularly, the systems and techniques use hand recognition to distinguish among users of gesture-based computer systems and provide user-appropriate interfaces as a result of this differentiation. Users with larger hands are classified as adults while users with sufficiently small hands (e.g., as measured against a model threshold size) are classified as children. In response to detecting a presence of a child, more child-appropriate features may be used in the interface. Such interface features may include visual portions (e.g., graphical elements, icons, background patterns, etc.) audio portions, thematic features, content access privileges, and so forth.

The techniques may be implemented in many different contexts. In certain implementations described below, the techniques are implemented as part of an augmented reality environment in which projectors and cameras create a three dimensional environment in which users can interact with objects and content. Gestures may be used in such augmented reality environments. However, the techniques may also be implemented in other computer-based systems that employ gesture recognition.

Example Environment

Figure 1:
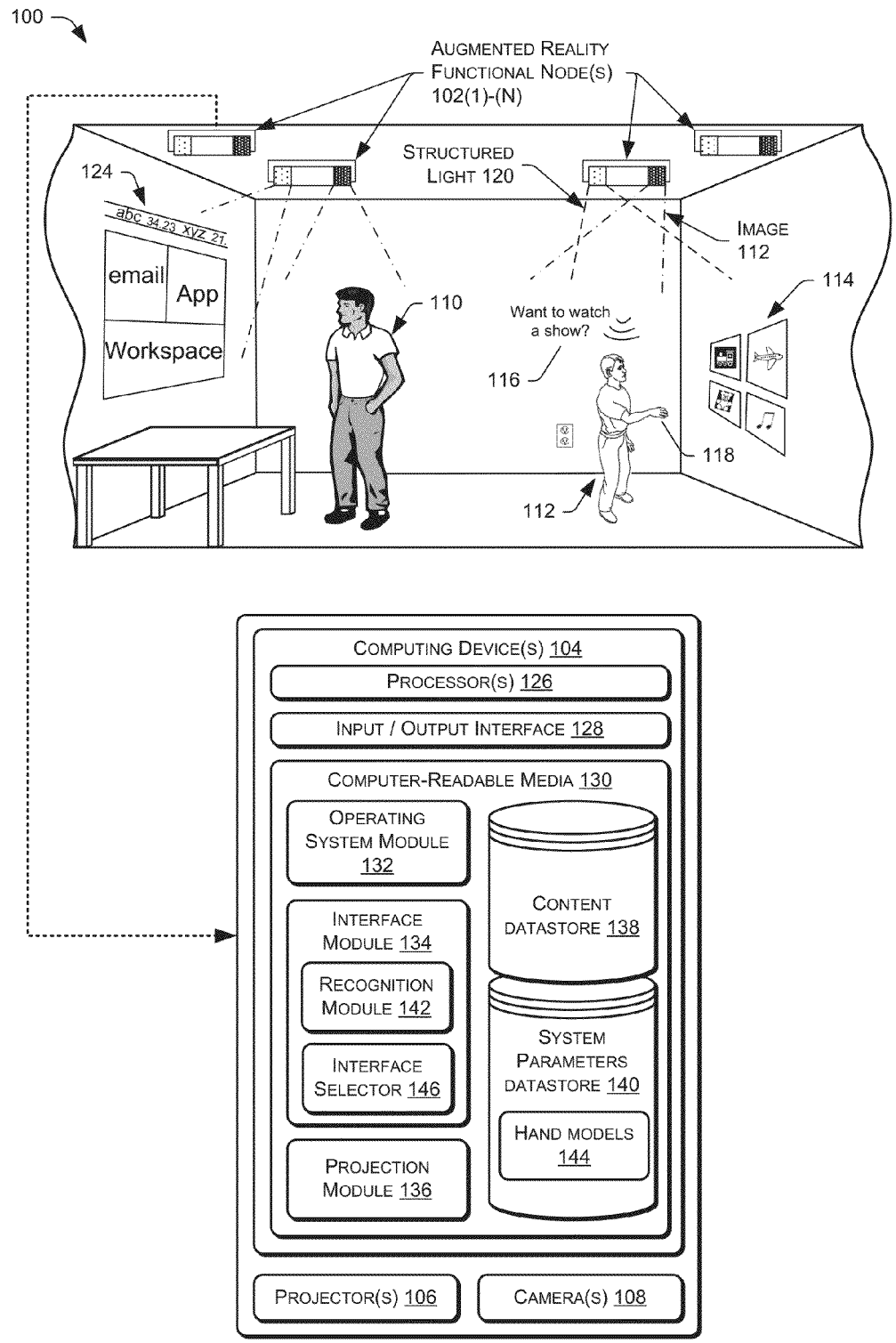
FIG. 1 illustrates an environment that includes multiple augmented reality functional nodes (ARFNs), and an adult and a child interacting with the ARFNs using hand gestures. Different user interfaces are presented within the environment depending upon whether the ARFNs recognize the user as an adult or a child.

FIG. 1 shows an illustrative augmented reality environment 100 in which the described techniques may be performed. The environment 100 includes one or more augmented reality functional nodes (ARFNs) 102(1), ..., 102(N) (collectively referred to as "the ARFN 102" in some instances). While the environment illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices having projection and imaging capabilities.

As illustrated, each ARFN 102 may include one or more computing devices 104, as well as one or more projectors 106 that, when active, project content onto any surface within the environment 100. The projected content may include electronic books, videos, images, interactive menus, or any other sort of visual content. For instance, a user within the environment may request that the ARFN 102 project a particular electronic book that the user wishes to read. In response, the ARFN 102 may project the book onto a projection surface within the environment. In another example, the same or different user may request that the ARFN 102 project a particular movie or show that the user wishes to watch. In response, the ARFN 102 may obtain the content (locally or remotely) and may project the content onto a surface in the environment. In yet another example, the ARFN 102 may be configured to project a user interface (UI), such as a keyboard, a slider bar, a virtual remote control to operate a television within the environment 100, or any other type of UI.

As discussed in further detail below, the ARFN 102 may include one or more cameras 108 that capture images of the environment. In some cases, the images may capture user interaction through use of gestures or other forms of interaction, and in response, the ARFN 102 may provide feedback to the user and/or may cause performance of actions corresponding to the user's selection. For instance, when the ARFN 102 projects an interface onto an object, the ARFN 102 may provide feedback to the user indicating which button(s) a user is in position to select, may identify a user's selection and, in response, may perform an operation according to the identified selection. While a few examples have been given, it is to be appreciated that the ARFN 102 may project any other sort of content within the environment 100, including audio, video, or other content that can be perceived by user senses (e.g., aromatic content). In addition, the ARFN 102 may recognize and interpret gestures that are made by the user without reference to a UI projected within the environment.

The ARFN 102 may further be equipped with microphones and speakers (not shown in FIG. 1, but in FIG. 2) to facilitate audible interaction with the user. The audible interaction may be in the form of predefined command words and responses, or through conversational exchanges that are recognized and interpreted by the ARFNs.

In FIG. 1, two users 110 and 112 are shown in the room defining the environment 100. The first user 110 represents an older person, such as an adult or parent. The second user 112 represents a younger person, such as a child. Physically, the child 112 is smaller than the adult 110. The ARFNs 102(1)-(N) are configured to detect and differentiate between the adult 110 and the child 112. In one approach, the ARFNs use hand recognition to make this differentiation. More particularly, the ARFNs may detect the hand size of the gesturing user, and deem a user as a child if a small hand is detected or as an adult if a large hand is detected. In some implementations, other physical characteristics of the hand besides size may be used, such as shape or curvature of the hand. In another approach, secondary indicia may be used to differentiate users, such as detection of other physical attributes (e.g., height, shape, hair color, etc.), voice recognition, audible question and answer exchange, and so forth. In still other approaches, a combination of hand size detection and secondary indicia may be used.

Depending upon whether the user is a child or an adult, the ARFN 102 selects an age-appropriate interface for engaging the user. For instance, suppose the user is identified as a child, such as the child 112. The ARFN 102 may then select interface features that are appropriate for a child. These interface features may include graphical elements, thematic music, wall paper, voice interaction dialog, and so forth. In this illustration, once a child 112 is detected, the ARFN projects a graphical user interface 114 onto a wall, and the user interface 114 contains more child appropriate icons. For instance, the user interface 114 may be composed primarily of simple images, such as individual boxes with cartoon looking symbols representing the content. In this illustration, the child 112 is given options to watch a TV show or movie about trains, airplanes, or animals. Or the child 112 may wish to listen to elementary aged music, such as the alphabet song. Correspondingly, to aid navigation, the ARFN 102 may provide additional audio communication 116, as represented by the audible dialog question "Want to watch a show?", to help the child 112 decide which option to select on the user interface 114. If the child answers "yes", the ARFN 102 may follow up with "how about a show about trains?" and enlarge the box with the train icon to assist the child in understanding the interface.

The child 112 can gesture with his hand 118 to select one of the four simple options. The ARFN 102 can then capture this movement, and respond accordingly. For instance, in one example implementations, the proximal ARFN 102 within the environment may project structured light 120. In addition, the ARFN may capture one or more images 122 within the environment for the purpose of identifying distortions in the structured light 120. While FIG. 1 illustrates one ARFN projecting this structured light and imaging the environment to identify the distortions, in some implementations, one or more other ARFNs may additionally or alternatively perform these functions. In either instance, by imaging the environment in this manner, the ARFNs 102 may identify the user's gestures within the environment. Such gestures may be interpreted as instructions or commands to be implemented by the ARFNs 102.

Note that certain embodiments may not involve the projection of structured light. Accordingly, it should be understood that use of structured light is but one example of various techniques that may be used in object recognition of objects, such as a hand, in a scene.

Suppose an ARFN 102 recognizes the person as being an adult 110. In response to this recognition, interface features suitable for an adult may be presented within the environment. In FIG. 1, the ARFN projects a graphical user interface 124 onto a different wall. The user interface 124 contains different, more sophisticated content, such as more text or higher level interactive elements. In this illustration, the user interface 124 includes a stock ticker showing current market pricing of equities, a first pane for email, a second pane for an open application, and a third pane for a workspace. The adult 110 may elect to interact with any of the content in the user interface 124 through use of voice commands, hand gestures, or through other input mechanism such as electronic devices or virtual presentations of input devices (e.g., projected keyboard onto the table).

As illustrated, the computing device 104 of the example ARFN 102 includes one or more processors 126, an input/output interface 128, and memory or computer-readable media 130. The processors 114 may be configured to execute instructions, which may be stored in the computer-readable media 130 or in other computer-readable media accessible to the processors 126.

Figure 2:
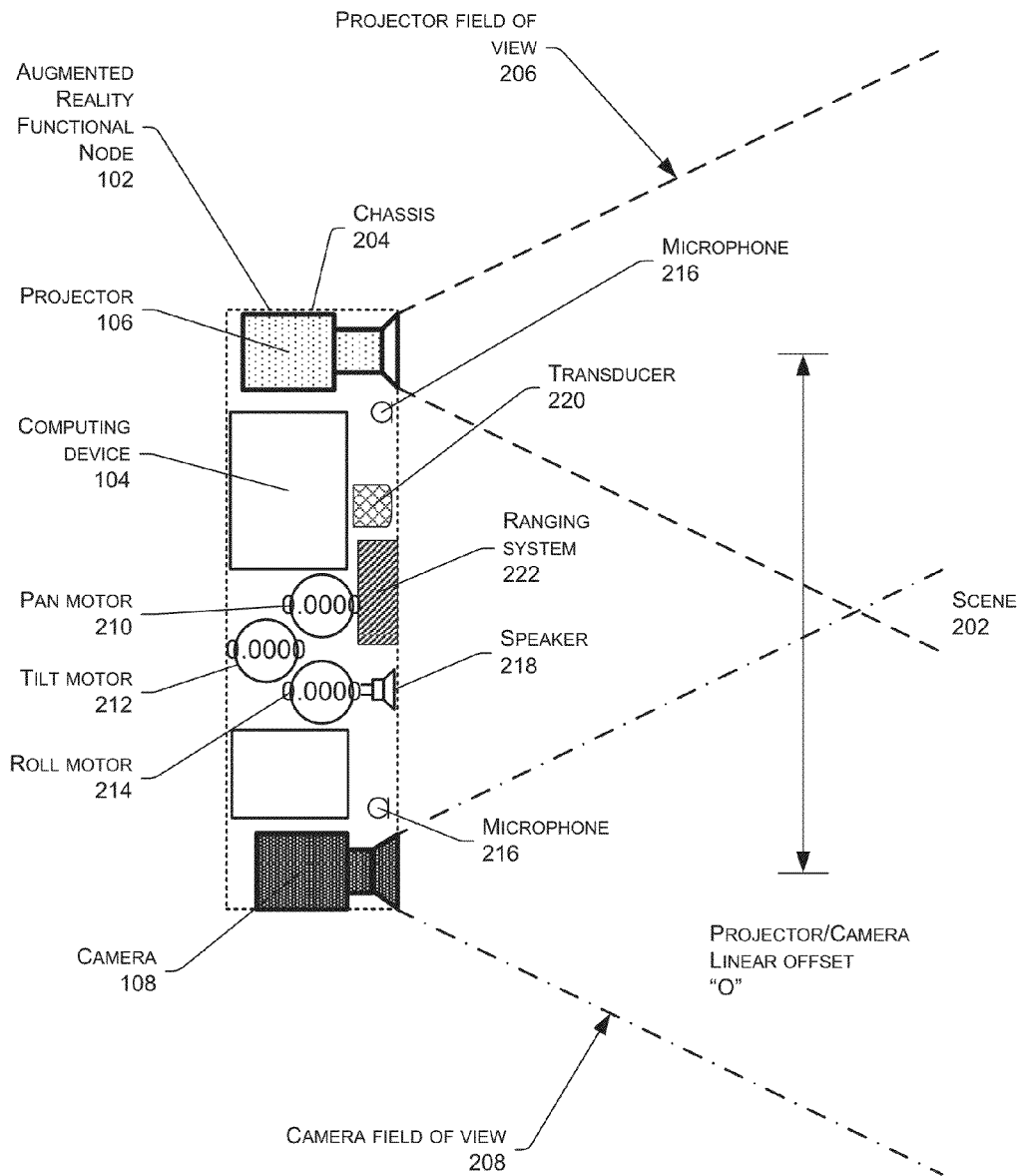
FIG. 2 illustrates an example ARFN that includes a computing device, a projector, a camera, and other selected components for allowing a user to interact with the ARFN with use of gestures interpreted by the ARFN.

The input/output interface 128, meanwhile, may be configured to couple the computing device 104 to other components of the ARFN 102, such as the projector 106, the camera 108, microphones, other ARFNs 102, other computing devices, and so forth. The coupling between the computing device 104 and the devices may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within the projector 106 or the camera 108. Therefore, it is to be appreciated that the illustration of the ARFN 102 of both FIGS. 1 and 2 is for illustrative purposes only, and that components of the ARFN 102 may be configured in any other combination and at any other location.

The computer-readable media 130, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 104. The computer-readable media 130 may reside within a housing of the ARFN, on one or more storage devices accessible on a local network, on cloud storage accessible via a wide area network, or in any other accessible location.

The computer-readable media 130 may store several modules, such as instructions, datastores, and so forth that are configured to execute on the processors 126. For instance, the computer-readable media 130 may store an operating system module 132, an interface module 134, a projection module 136, a content datastore 138, and a system parameters datastore 140.

The operating system module 132 may be configured to manage hardware and services within and coupled to the computing device 104 for the benefit of other modules. The interface module 134, meanwhile, may be configured to receive and interpret commands received from users within the environment 100. For instance, the interface module 134 may analyze and parse images captured by the camera 108.

The interface module 134 may include a recognition module 142 to detect and identify hand gestures made by users within the environment 100. As will be described in more detail, the recognition module 142 may implement any number of techniques for recognizing a user's hand and differentiating whether the hand is that of a child or an adult. The recognition module 142 may use, for example, depth information from a depth sensor to segment objects found in the images. Once segmented, the recognition module 142 may identify an object as being a hand, and estimate the size and/or contour of the hand. The size and/or contour of the hand may then be compared to hand models 144 maintained in the system parameters datastore 140. If the hand compares favorably to models of a child's hand, the recognition module 142 deems the hand in the image as belonging to a child, such as the child 112. Alternatively, if the hand compares more favorably to an adult hand, the recognition module 142 deems the hand in the image as belonging to an adult, such as the adult 110.

The interface module 134 may further include an interface selector 146 to determine which interface features should be used to engage the user based on whether the user is identified as a child or an adult. In the illustrated example, if the recognition module 142 determines that a hand in an image captured by the camera 108 belongs to the child 112, the interface selector 146 chooses child-appropriate features, such as presenting the graphical UI 114 with large buttons having cartoon-like pictures and using age-appropriate audible dialogue 116. If, however, the recognition module 142 determines that the hand belongs to the adult 110, the interface selector 146 chooses interface features more suitable for an adult, such as presenting a more sophisticated UI 124.

In response to recognizing the hand and identifying an associated gesture, the interface module 134 may interpret the gesture and cause the ARFN 102 to perform a corresponding action. For instance, if the child 112 makes a gesture requesting that the ARFN 102 project a certain piece of content (e.g., by motioning to the plane button to choose a show associated with airplanes), the interface module 134 may interpret the gesture and cause the projection module 136 to project this content via the projector 106.

The content datastore 138, meanwhile, stores content for outputting within the environment. For instance, the content datastore may store applications and data for use within the environment 100. The projection module 136 may access the content datastore 138 in order to project requested content within the environment 100. For instance, when the user requests that the ARFN 102 project a particular electronic book, the projection module 136 may access the content datastore 138 to retrieve and cause projection of the desired electronic book.

In addition to storing the hand models 144, the system parameters datastore 140 may further maintain information about the state of the computing device 104, the projector 106, the camera 108, and so forth. For example, and as described in detail below, the ARFN 102 may be configured to pan and tilt for the purpose of allowing the projector 106 and the camera 108 to access different projection surfaces in the environment 100. As such, the system parameters maintained in the datastore 140 may include current pan and tilt settings of the camera and projector, an indication of content that the ARFN 102 is currently projecting or otherwise outputting, and the like.

The system parameter datastore 140 (or another datastore) may further store a library of reference gestures that may be used to interpret user gestures. As illustrated, the user in the room may make gestures with his body, such as hand motions, that can be captured by the cameras. The computing device identifies motion parameters corresponding to the observed gesture. The motion parameters are compared to those of the gesture library. The device then classifies the observed gesture based on the comparison.

Example ARFN

FIG. 2 shows additional details of an example ARFN 102 that may be configured to project a user interface (UI), and to identify and respond to user gestures, as described above with reference to FIG. 1. The ARFN 102 is configured to scan at least a portion of a scene 202 and the objects therein. The ARFN 102 may also be configured to provide output, such as images, sounds, and so forth.

A chassis 204 holds the components of the ARFN 102. One or more projectors 106 may be disposed within the chassis 204 and may be configured to generate and project images into the scene 202. These images may be visible light images perceptible to the user, visible light images imperceptible to the user, images with non-visible light, or a combination thereof. The projector 106 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 106 has a projector field of view 206 which describes a particular solid angle. The projector field of view 206 may vary according to changes in the configuration of the projector. For example, the projector field of view 206 may narrow upon application of an optical zoom to the projector.

One or more cameras 108 may also be disposed within the chassis 204. The camera 108 is configured to image the scene in visible light wavelengths, non-visible light wavelengths, or both. The camera 108 has a camera field of view 208 that describes a particular solid angle. The camera field of view 208 may vary according to changes in the configuration of the camera 108. For example, an optical zoom of the camera may narrow the camera field of view 208.

In some implementations, a plurality of cameras 108 may be used. For instance, one embodiment of the ARFN 102 may include a three-dimensional (3D), infrared (IR) camera and a red-green-blue (RGB) camera. The 3D, IR camera may be configured to capture information for detecting depths of objects within the scene 202, while the RGB camera may be configured to detect edges of objects by identifying changes in color within the scene 202. In some instances, a single camera may be configured to perform these functions.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector 106 and/or the camera 108. For example, in one implementation the actuator may comprise a pan motor 210, a tilt motor 212, a roll motor 214, and so forth. The pan motor 210 is configured to rotate the chassis 204 in a yawing motion. The tilt motor 212, meanwhile, is configured to change the pitch of the chassis 204. The roll motor 214 is configured to move the chassis 204 in a rolling motion. By panning, tilting, and/or rolling the chassis 204, different views of the scene may be acquired.

One or more microphones 216 may be disposed within the chassis 204, or elsewhere within the scene 202. These microphones 216 may be used to acquire input from the user, may be used to determine the location of a sound, or may be used to otherwise aid in the characterization of and receipt of input from the scene. For example, the user may make a particular noise, such as a tap on a wall or snap of the fingers, which are pre-designated as attention command inputs. The user may alternatively use voice commands. Such audio inputs may be located within the scene using time-of-arrival differences among the microphones and used to summon an active zone within the augmented reality environment.

One or more speakers 218 may also be present to provide for audible output. For example, the speakers 218 may be used to provide output from a text-to-speech module or to playback pre-recorded audio.

A transducer 220 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

The ARFN 102 may also include a ranging system 222. The ranging system 222 is configured to provide distance information from the ARFN 102 to a scanned object or a set of objects. The ranging system 222 may comprise radar, light detection and ranging (LIDAR), ultrasonic ranging, stereoscopic ranging, and so forth. In some implementations the transducer 220, the microphones 216, the speaker 218, or a combination thereof may be configured to use echolocation or echo-ranging to determine distance and spatial characteristics.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment, such as televisions, stereo systems, lights, and the like.

FIG. 2 also illustrates a projector/camera linear offset designated as "O". This is a linear distance between the projector 106 and the camera 108. Placement of the projector 106 and the camera 108 at a distance "O" from one another may aid in the recovery of 3D structured light data from the scene. The known projector/camera linear offset "O" may also be used to calculate distances, dimensioning, and otherwise aid in the characterization of objects within the scene 202. In other implementations the relative angle and size of the projector field of view 206 and camera field of view 208 may vary. Also, the angle of the projector 106 and the camera 108 relative to the chassis 204 may vary.

In other implementations, the components of the ARFN 102 may be distributed in one or more locations within the environment 100. As mentioned above, microphones 216 and speakers 218 may be distributed throughout the scene. The projector 106 and the camera 108 may also be located in separate chasses 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Hand Detection Example

Figure 3:
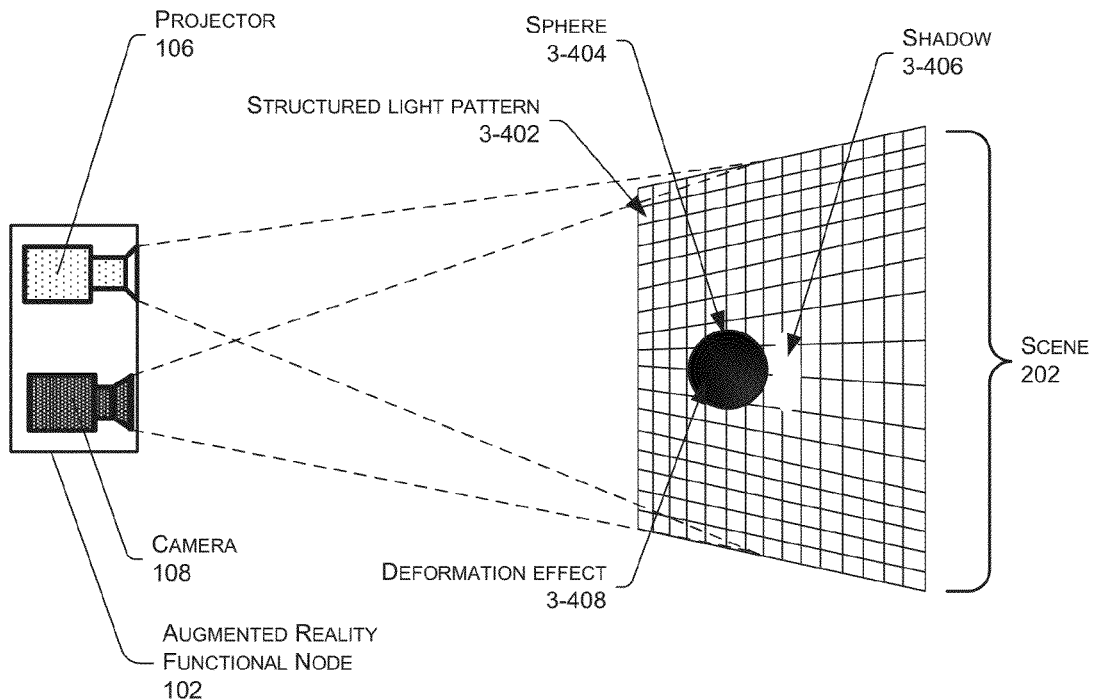
FIG. 3 is an illustrative diagram of the ARFN using structured light to identify surfaces, objects, and user interactions within an environment. By identifying user interactions, the ARFN is able to determine when a user is requesting that the ARFN perform a specified action.

FIG. 3 is an illustrative diagram of the ARFN 102 using structured light to identify 3D information regarding users, user hands, and other objects within an environment. However, while the structured light techniques described herein provide one example for obtaining 3D information regarding these objects, it is to be appreciated that 3D information may be determined in other manners in other embodiments.

In the instant illustration, the projector 106 projects a structured light pattern 302 onto the scene 202. In some implementations a sequence of different structured light patterns 302 may be used. In other implementations, other devices such as general room lighting may generate structured light patterns. A light fixture, bulb, and so forth may be configured such that emitted light contains one or more modulated structured light patterns 302. For example, two structured light patterns may be presented, each at a different non-visible wavelength within the structure of an incandescent bulb.

The cameras 108 used to detect the structured light may also be incorporated into bulbs or assemblies suitable for installation in existing light fixtures. These assemblies may be configured to communicate with the computing device 104 wirelessly or via transmission of a signal via the household electrical wiring. In some implementations, the assembly may provide pre-processing of input prior to sending data along to the computing device 104.

This structured light pattern 302 may be in wavelengths that are visible to the user, non-visible to the user, or a combination thereof. The structured light pattern 302 is shown in this example as a grid for ease of illustration and not as a limitation. In other implementations other patterns, such as bars, dots, pseudorandom noise, and so forth may be used. Pseudorandom Noise (PN) patterns are useful as structured light patterns because a particular point within the PN pattern may be specifically identified. A PN function is deterministic in that given a specific set of variables, a particular output is defined. This deterministic behavior allows for specific identification and placement of a point or block of pixels within the PN pattern. In some implementations, a plurality of structured light patterns 302 may be used to image the scene. These may include different PN patterns, geometric shapes, and so forth.

For illustrative purposes, a sphere 304 is shown positioned between the projector 106 and a wall in the scene 202. A shadow 306 from the sphere 304 appears on the wall. Inspection of the sphere 304 shows a deformation or distortion effect 308 of the structured light pattern 302 as it interacts with the curved surface of the sphere 304.

In some implementations other effects, such as dispersion of the structured light pattern 302, may be used to provide information on the topology of the scene. Where the projector 106 and camera 108 have differing fields of view, such as shown in FIG. 2, the dispersion or change in the "density" of the structured light pattern 302 may be used to determine depth of field.

The camera 108 detects the interaction of the structured light pattern 302 with objects within the scene. For example, the deformation effect 308 on the sphere 304 is detected by the camera 108. The camera may similarly identify deformation effects on users within the environment and may utilize this information to identify user gestures and how trajectories of these gestures. That is, the camera 108 may identify, via deformation in the structured light, a location of a selection tool (e.g., a user's finger) as this location changes over time. The ARFN 102 may then use these locations tracked over time to identify a trajectory of the gesture.

Figure 4:
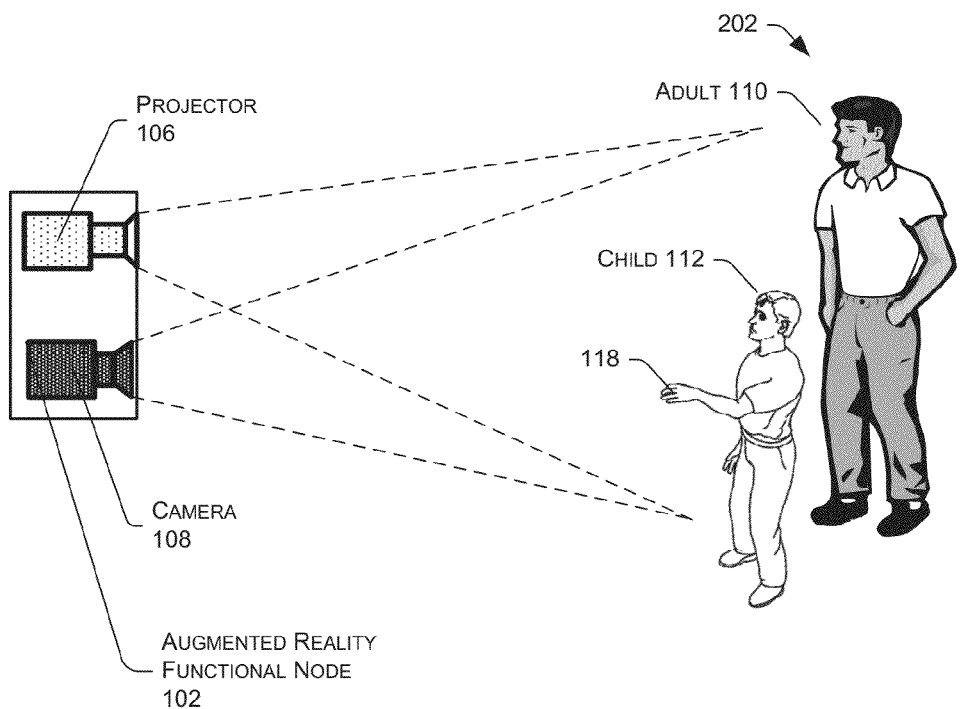
FIG. 4 is an illustrative diagram of the ARFN detecting a user's hand, such as the parent's hand and the child's hand, and recognizing gestures made by the hand.

FIG. 4 illustrates an example of how the ARFN 102 may be used to observe and identify hand gestures within the scene 202. FIG. 4 shows the adult 110 and the child 112 both located in the same scene 202. The child 112 is illustrated with his hand 118 extended. The hands of the adult 110 and child 112 are examples of human characteristics within the environment 100 that may be analyzed by the ARFN 102 to differentiate between an adult and child. It is noted that other physical features may be used in addition to, or separately from, the hands. For instance, a person height, size, outline, color, biometric features, and so forth may be used to help differentiate the two users. Further, other indicia of age may be detected by the ARFN, such as voice recognition or response to a verbal authentication question. The following discussion will continue in the context of recognizing hands as the physical characteristic to help illustrate the techniques.

To identify hand gestures, the ARFN 102 detects and tracks the hand 118 of the child 112 (or that of the adult 110) within the environment or scene 202. Specifically, the ARFN 102 may identify a sequence of hand positions or poses that form a hand gesture. A hand gesture may be defined by a series of poses of the hand 404, where each pose indicates the 3D position of the hand 404 and the 3D angular orientation of the hand 404. Position and angular orientation may be evaluated as absolute positions and orientations or as relative positions and orientations. As an example, 3D position coordinates may be specified relative to orthogonal X, Y, and Z axes. 3D angular orientations may be specified as rotations about the X, Y, and Z axes.

As described above, the camera 108 may be used in conjunction with a structured light pattern projected by the projector 106 to capture 3D information regarding objects within the scene 202. Specifically, the projector 106 may project a structured light pattern onto the scene 202, and the camera 108 may capture a 2D image or array that indicates the resulting reflected light pattern, which is potentially distorted by objects within the scene 202. The reflected light pattern can be analyzed to reconstruct 3D characteristics or models of objects within the environment 100.

In addition to being used to observe a reflected light pattern, as described above, the camera 108 of the ARFN 102 may be used to capture 2D images of the scene 202. For example, the camera 108 may be used in conjunction with ambient lighting, with or without further illumination by the projector 106, to capture a 2D image of the environment 100. The captured 2D image may be a color or grayscale image, comprising an array of pixels defined by tone or color intensities.

As described above, the projector 106 may be configured to project non-visible light, or light of a specific wavelength that can be filtered by the camera 108 or by electronics associated with the camera 108. This may allow the ARFN 102 to obtain, from a single image capture, a 2D color image of the scene 202 and a 2D pattern image of the projected light pattern as reflected by the user hands, such as the child's hand 118.

Note that certain embodiments may implement 3D shape detection, analysis, and reconstruction using techniques that do not involve the projection and/or analysis of structured light. Accordingly, it should be understood that structured light analysis is described as but one example of various 3D analysis techniques that may be used to identify 3D shapes within a scene or within regions of a scene.

Example Processes

Figure 5:
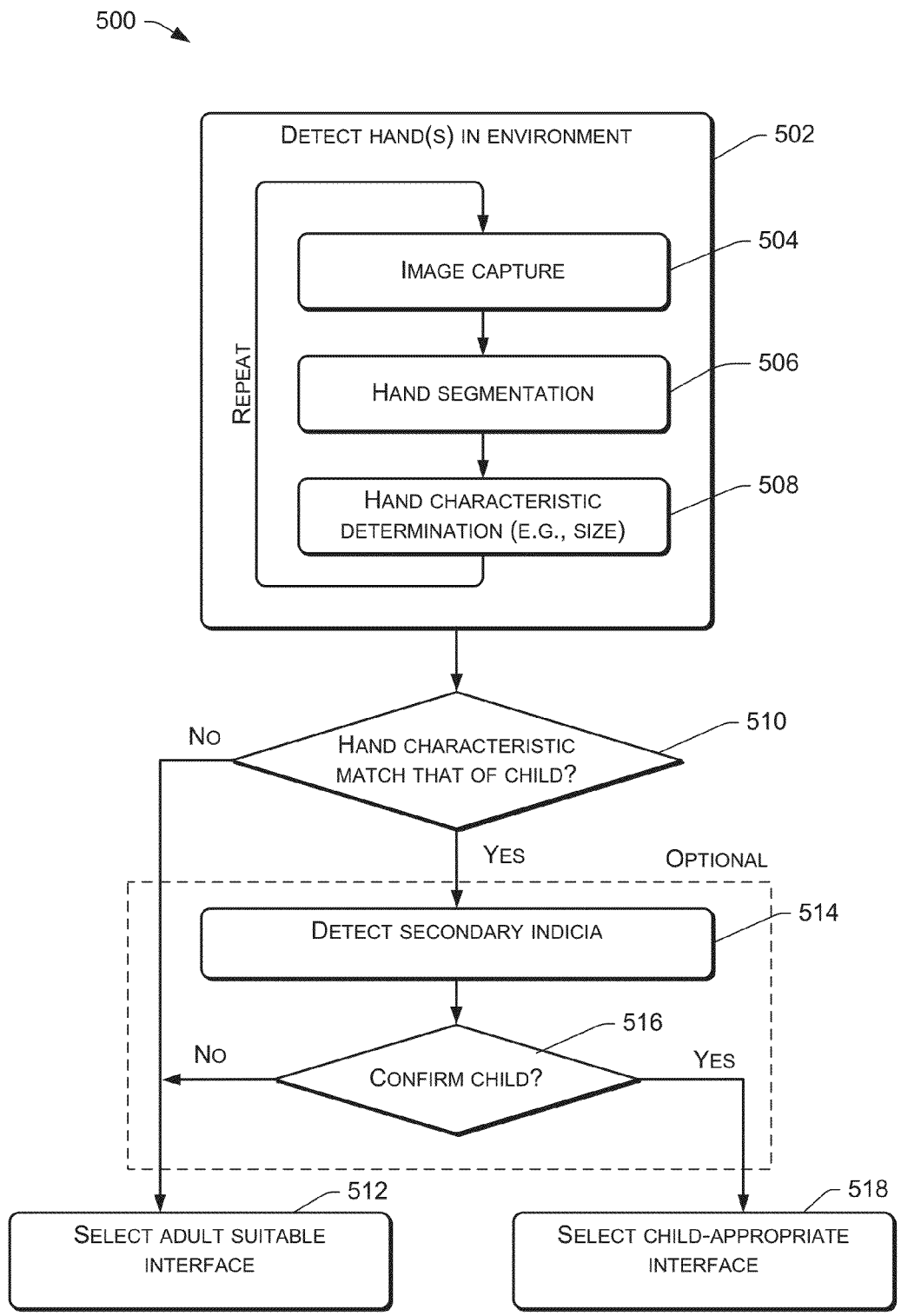
FIG. 5 illustrates an example flow diagram of a process for differentiating gestures made by adults from those made by children, and modifying the user interfaces as a result.

FIG. 5 illustrates an example process 500 of using a projection and imaging system (e.g., an ARFN 102) to recognize a hand in a sequence of images, such as images showing a hand making gestures, and identify whether the user is an adult or child based on the hand alone, or in combination with other secondary indicia. Depending upon the outcome, an appropriate interface is selected. The process 500 is illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

The process 500 will be described as being performed by the projection and image capture architectures described above with reference to FIGS. 1-4. However, the process 500 may be performed using other architectures and means of image capture and/or scene analysis.

At 502, an iterative process is performed to capture and analyze a series of images taken from the scene 202 to detect the presence of one or more hands. Several actions are performed repetitively, with respect to subsequent images or frames corresponding to successive instances in time. Generally, the action 502 involves capturing a sequence of images showing a hand in motion, such as when the hand is making a gesture, and using the images to derive characteristics of the hand, such as size, contour, and/or control points.

Each repetition of the action 502 more specifically includes an action 504 of capturing one or more images of the scene 202, including those parts or regions of the scene 202 that may contain a hand, such as the child's hand 118. In the described embodiment, the one or more images may be 2D images captured by the camera 108. The one or more images may also include other data objects, such as images containing 3D information corresponding to the scene 202. For example, certain captured images may show a reflected light pattern, based on a structured light pattern that is projected by the projector 106. Three dimensional information or characteristics regarding the scene may be obtained by analyzing the reflected light pattern. Alternatively, or in addition, the captured images may include images of the scene 202 taken from different perspectives, which may be analyzed in comparison to each other to reconstruct 3D characteristics of the scene 202.

An action 506 involves segmenting the hand captured in the image taken from the scene 202. Object segmentation involves performing various types of shape analysis, including 2D and/or 3D techniques, to identify the hand 118 within the scene 202. In certain implementations, the segmentation produces a contour of the hand which may then be used to differentiate certain physical characteristics of the hand, such as palm size and/or control points (e.g., finger tips, midpoints along fingers, valleys between fingers, etc.).

An action 508 provides for determination of hand characteristics from the segmentation data. Various techniques may be used to ascertain these characteristics. For instance, the general size the hand may be estimated based on dimensions of the palm. Alternatively, curvature and distance mapping may be used to represent features of the hand as seen in images captured from the scene. Generally, with this approach, points along a periphery of the hand are translated into a map of the hand's curvature and a map of distances between the points. In still another approach, control points may be computed from the hand image. The number and position of control points may vary for different objects. For the human hand, for example, the control points include distinctive points such as tips of fingers, mid-points along each side of the fingers, valley points between fingers, and so forth. Representative examples of action 508 involving mapping an open and a partially occluded hand are described below in more detail with reference to FIGS. 6A-6C.

The actions 504-508 can be repeated for as many images as desired. Once a hand is detected and characteristics determined, these characteristics are examined to see if they match that of a child at 510. For instance, the analysis at 510 may include comparing the size or curvature of the hand with threshold sizes associated with children as maintained in the model library 144. If the hand characteristics do not match that of the child (i.e., "no" branch from 510), an interface suitable for an adult is selected and applied to the environment at 512. This is shown in FIG. 1, for example, by projecting the graphical UI 124 on the wall next to the adult 110. It is noted that the default may be for an adult interface, and hence the proactive action 512 may be assumed.

Conversely, if the hand characteristics match that of the child (i.e., "yes" branch from 510), additional optional acts may be performed to confirm that the user is indeed a child. One optional action 514 involves detection secondary indicia that may be used to help confirm the user as a child. The secondary indicia might include voice recognition, height analysis, outline of the body, color analysis (e.g., hair or eye color measured against expected household users), answers to authentication questions, and so forth. At 516, it is determined whether the secondary indicia confirm that the user is a child. If not (i.e., the "no" branch from 516), the adult interface is selected.

But, if the indicia confirm presence of a child (i.e., the "yes" branch from 516), a child appropriate interface is selected at 518. This is shown in FIG. 1, for example, where the interface includes the graphical UI 114 projected on the wall next to the child 112 and use of simple verbal dialog 116.

Figure 6A:
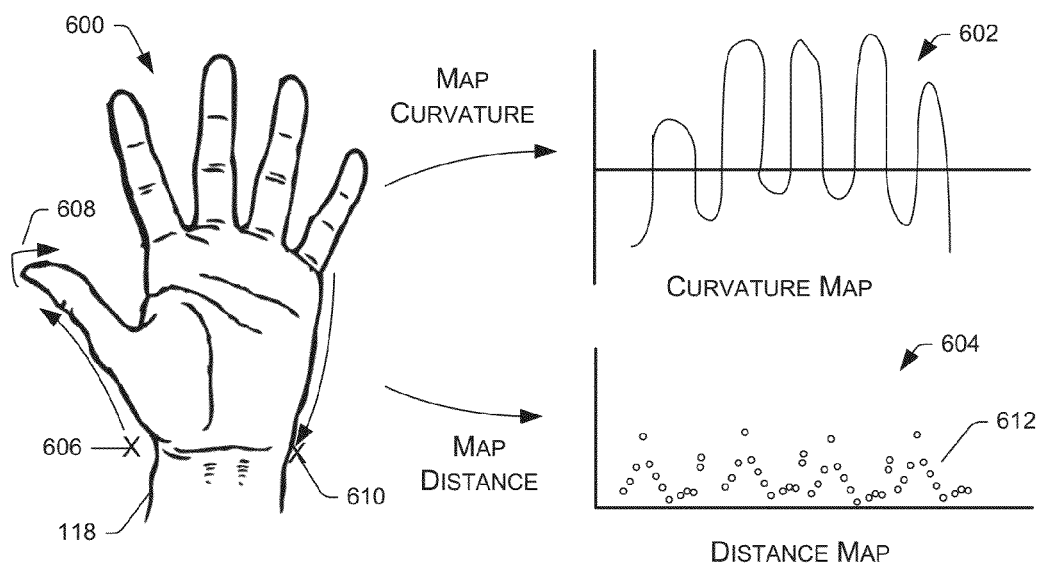
FIGS. 6A-6C illustrate example techniques for recognizing a hand, and determining characteristics that may be used to differentiate a child's hand from an adult's hand.
Figure 6B:
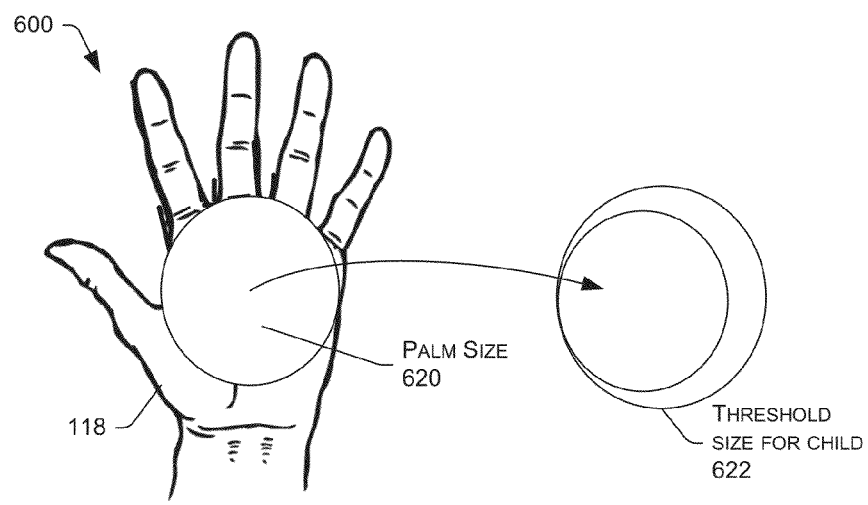
Figure 6C:
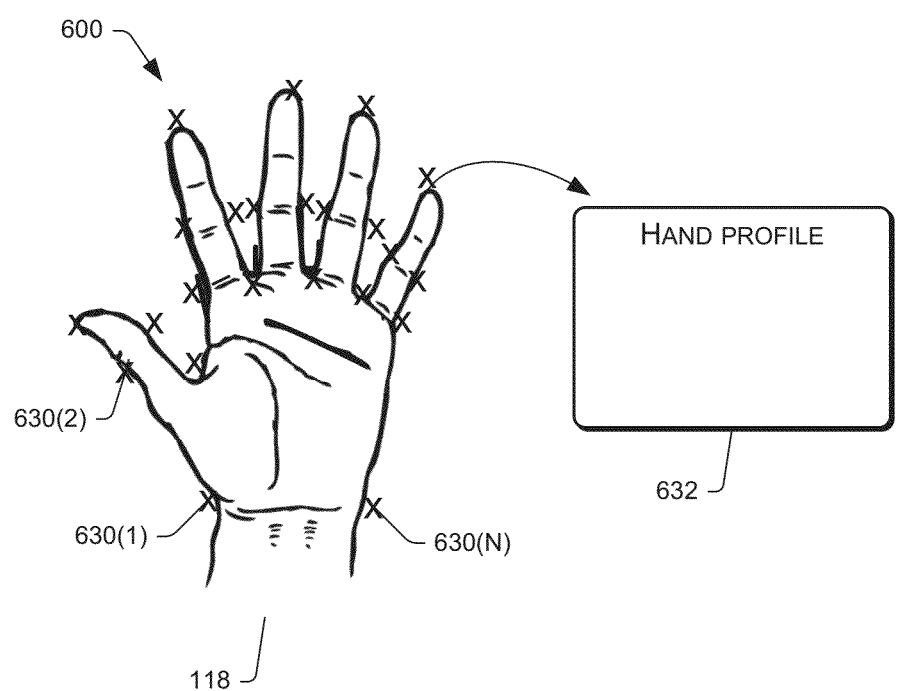

FIGS. 6A-6C illustrate example techniques for recognizing a hand, and determining characteristics that may be used to differentiate a child's hand from an adult's hand.

FIG. 6A shows a 2D image 600 of the human hand, such as the child's hand 118. In this view, the hand 118 is open with all five fingers independently distinguishable. The 2D image of the hand is mapped into two plots: a first or curvature map 602 and a second or distance map 604. The curvature map 602 is formed by mapping the curvature of the hand 404 in terms of a predefined translation function associated with the curvature. The 2D image may be segmented to define a contour of the hand, and then the outer periphery of the hand may be traced. In this illustration, the hand periphery may be traced beginning at a point 606 at the base of the palm, around each of the fingers (as represented by the arrows 608), and terminating at a point 610 at the base of the palm on the opposite side.

The translation function may be essentially any rule that graphically captures curvature of the hand in the 2D image. For example, one function may be to express the contour in terms of direction changes along the hand where leftward movement is positive on the curvature map 602 and rightward movement is negative. Another example function may be to express in terms of vertical direction so that upper movement is positive on the curvature map 602 and downward movement is negative. Essentially any translation function may be used, so long as the function is consistently applied across the 2D images of the hand.

The distance map 604 is formed as a function of distance along the curvature of the hand image 600. One approach to plotting the distance is to express the points 612 in the distance map 604 as an absolute value of the distance between points along the curvature. Accordingly, the distances between points along the lengths of the fingers tend to be greater in comparison to the distances between points along the finger tips and valleys. Said another way, points on transitions between positive and negative portions of the curvature map tend to be closer together than points between the positive and negative transitions.

The curvature map 602 and the distance maps 604 may be used to identify the hand as belonging to an adult or a child. Essentially, the distance map 604 is used to account for scaling differences within the environmental space. For instance, the same hand may be captured at different depths in various images of the scene. The same hand may therefore exhibit different sizes in the 2D images. The distance map 604 allows the two different images to be adjusted for this scaling difference, so that depth is removed as a factor in the recognition process. The curvature map 602 may then be compared to other curvature maps associated with adults and/or children. If the curvature map more closely resembles model maps of children hands, the system assumes the user is a child. Conversely, if the curvature map more closely resembles model maps of adult hands, the system assumes the user is an adult.

FIG. 6B shows a second technique in which palm size is computed for the hand 118 in the 2D image 600. From the contour of the hand 118, the largest circle or ellipse 620 that can be drawn, so that its circumference touches at least some of the boundaries at the top, bottom, and sides of the palm, is estimated. This circle/ellipse 620 is then compared to circles/ellipses associated with adults and children in the model library 144. A threshold circle/ellipse 622 for a child is shown in FIG. 6B. If the circle/ellipse 620 is smaller than the threshold circle/ellipse 622, then the user is deemed to be a child.

FIG. 6C shows a third technique in which control points 630(1)-(N) from the 2D image 600 are computed. Example control points 630 are illustrated as "x" marks at the fingertips, valleys between fingers, base of the palm, and midpoints along each finger. A hand profile 632 may be formed from these control points. The hand profile 632 may then be compared to other profiles in the model library 144 to determine whether the more closely match an adult hand or a child hand.

The techniques of FIGS. 6A-6C are merely examples. Other techniques to uniquely identify hands may be used separately, or in combination with the techniques described herein.

Figure 7:
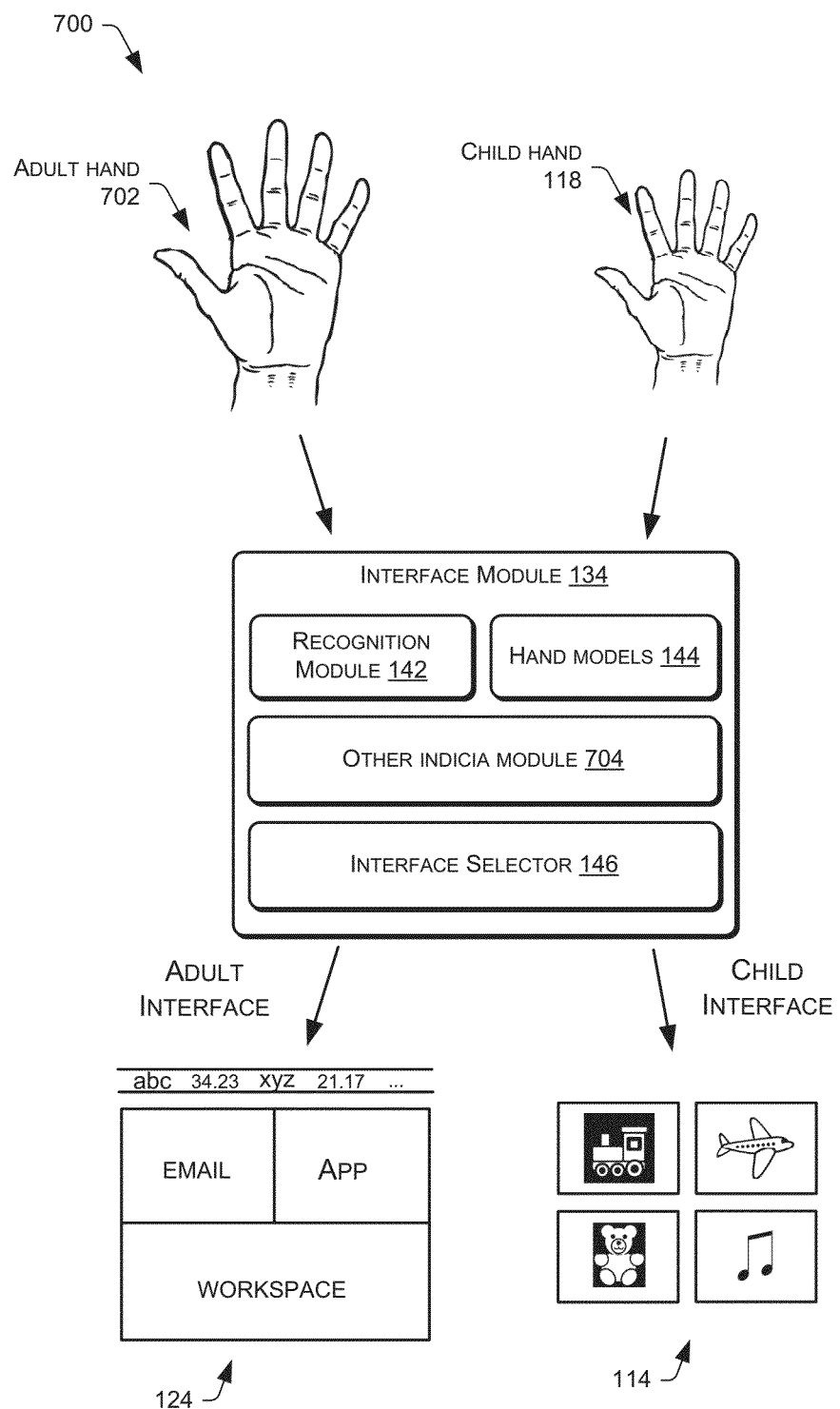
FIG. 7 shows how child appropriate features are selected based on hand recognition.

FIG. 7 provides a diagrammatic illustration 700 to show how the interface module 134 uses hand recognition to select appropriate interfaces for children or adults. In this illustration, two hands—an adult hand 702 and a child's hand 118—are being analyzed by the interface module 134. An image of each hand is passed to the recognition module 142. The recognition module 142 employs one or more techniques to compute one or more physical characteristics of the hands, such as the techniques described above with respect to FIGS. 6A-6C. The physical characteristics of the hand may be compared to models of adult and children hands maintained in a model library 144.

The interface module 134 may further implement an indicia module 704 to track other indicia of the user, such as the user's height, hair color, general size, voice composition, and so forth.

The interface selector 146 uses the information from the recognition module 142 and the indicia module 704 to determine whether the hand belongs to an adult or a child. Based on this determination, the interface selector 146 chooses an appropriate interface. As shown, detection of the adult hand 702 results in selection of the adult interface 124 with a more sophisticated look and feel, and higher level content. Alternatively, detection of the child's hand 118 results in selection of the child interface 114 with its more simplistic, child-like buttons.

It is noted that the above illustrative examples have been described as using the hand as the body portion for differentiating among adults and children. In some implementations, other body portions may be used, such as an arm, a head, a torso, or a leg. These body portions are measureable and the size differs recognizably between adults and children. Further, the length or size of these body portions may be measured from images and compared with models of similar body portions representative of children and adults.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more processors;
one or more projectors to project a visual portion of an interface into an environment;
one or more cameras to capture an image of the environment, the image showing at least a hand of a person;
one or more computer-readable media storing computer-executable instructions that, when executed by the one or more processors, cause the one or more processors to perform acts comprising:
detecting the hand in the image;
determining a physical characteristic of the hand in the image by translating points along a periphery of the hand in the image into a set of values on a curvature map and by determining a distance between a first point and a second point of the points on a distance map that is different from the curvature map;
comparing the physical characteristic of the hand with one or more model characteristics associated with a hand model representative of a child's hand; and
based on the physical characteristic of the hand matching, at least in part, the one or more model characteristics associated with the hand model representative of the child's hand, selecting child-appropriate features for the interface for interacting with the child.

2. The system of claim 1, wherein the physical characteristic comprises one of a size of the hand, a curvature of the hand or a shape of the hand.

3. The system of claim 1, wherein the physical characteristic is determined by deriving an approximate size of a palm portion of the hand in the image.

4. The system of claim 1, wherein the physical characteristic is determined by control points marked along features of the hand in the image.

5. The system of claim 1, wherein the one or more computer-readable media store additional computer-executable instructions that, when executed by the one or more processors, cause the one or more processors to perform acts comprising: evaluating secondary indicia captured from the environment that differentiates between an adult and child, wherein the secondary indicia is used to confirm presence of a child in the environment.

6. The system of claim 1, wherein the one or more computer-readable media store additional computer-executable instructions that, when executed by the one or more processors, cause the one or more processors to perform acts comprising selecting an adult interface for interacting with an adult based at least partly on a determination that the physical characteristic of the hand fails to acceptably match the hand model representative of the child.

7. The system of claim 1, wherein the one or more projectors project a pattern into the environment and onto the hand, wherein the one or more cameras capture the image based at least in part on analyzing a reflection of the pattern.

8. A system comprising:
a camera to capture an image of a hand within an environment; and
a computing device configured to:
determine a physical characteristic of the hand from the image by translating points along a periphery of the hand in the image into a set of values on a curvature map and by determining a distance between a first point and a second point of the points on a distance map that is different from the curvature map;
determine whether the hand is associated with an adult or a child; and
select a first interface for use in the environment to facilitate human interaction with the computing device based at least partly on a first determination that the hand is associated with a child and a second interface for use in the environment to facilitate human interaction with the computing device based at least partly on a second determination that the hand is associated with an adult.

9. The system of claim 8, wherein the computing device is configured to determine, from the image, at least one of a size of the hand, a shape of the hand, or a curvature of the hand.

10. The system of claim 8, wherein the computing device is configured to compare the physical characteristic of the hand to one or more model characteristics associated with a hand model, the hand model being representative of a child's hand.

11. The system of claim 8, wherein the camera captures other physical features of a person in the image, and the computing device is further configured to evaluate the other physical features of the person to confirm a determination that the hand is associated with one of the adult or the child.

12. The system of claim 8, further comprising at least one projector to project a visual portion of the interface onto a surface in the environment.

13. The system of claim 8, further comprising at least one microphone to receive audio input from a person associated with the hand, wherein the computing system is further configured to analyze the audio input from the person to confirm a determination that the hand is associated with one of the adult or the child.

14. A system comprising:
a projector to project visual portions of a human-to-computer interface onto a surface in an environment;
a camera to capture an image of the environment, the image including at least a portion of a human; and
a computing device configured to;
determine whether the portion of the human is associated with an adult or a child based, at least in part, on a size of the portion of the human;
determine that the size of the portion of the human is insufficient to indicate that the human is an adult or a child;

determine, from the image and based at least partly on a determination that the size of the portion of the human is insufficient to indicate that the human is an adult or a child, secondary indicia associated with the human; and select a first interface for use in the environment to facilitate human interaction with the computing device based at least partly on a first determination that the portion of the human is associated with a child and a second interface for use in the environment to facilitate human interaction with the computing device based at least partly on a second determination that the portion of the human is associated with an adult.

15. The system of claim 14, wherein the portion of the human comprises at least one of a head, an arm, a hand, a torso, or a leg.

16. One or more non-transitory computer-readable media storing computer-executable instructions that, when executed by one or more processors, cause the one or more processors to perform acts comprising:

detecting a hand of a user in an image captured from an environment;

determining a physical characteristic associated with the hand by translating points along a periphery of the hand in the image into a set of values on a curvature map and by determining a distance between a first point and a second point of the points on a distance map that is different from the curvature map;

ascertaining whether the hand is associated with a child or an adult based, at least in part, on the physical characteristic associated with the hand; and selecting among multiple features to use in an interface for interacting with the user depending, at least in part, on whether the hand is associated with a child or an adult.

17. The one or more non-transitory computer-readable media of claim 16, wherein the physical characteristic comprises at least one of a size of the hand, a shape of the hand, or a curvature of the hand.

18. The one or more non-transitory computer-readable media of claim 16, further comprising instructions that, when executed by one or more processors, cause the one or more processors to perform acts comprising evaluating secondary indicia collected from the environment to confirm whether the hand is associated with a child or an adult.

19. The one or more non-transitory computer-readable media of claim 16, further comprising instructions that, when executed by one or more processors, cause the one or more processors to perform acts comprising projecting a first graphical elements as part of the interface based at least partly on a first determination that the hand is associated with a child and a second graphical elements as part of the interface based at least partly on a second determination that the hand is associated with an adult.

20. A method comprising:

determining a physical characteristic associated with a hand as observed in an environment by a computing system, the physical characteristic being determined by translating points along a periphery of the hand into a set of values on a curvature map and by determining a distance between a first point and a second point of the points on a distance map that is different from the curvature map;

ascertaining, by the computing system, whether the hand is associated with a child or an adult based, at least in part, on the physical characteristic; and based at least partly on a determination that the hand is associated with the child, selecting one or more child-appropriate features for an interface to facilitate interaction between the child and the computing system.

21. The method of claim 20, wherein the one or more child-appropriate features comprises a combination of graphical elements and audio dialog.

22. The method of claim 20, wherein the physical characteristic comprises at least one of a size of the hand, a shape of the hand, or a curvature of the hand.

23. The method of claim 20, wherein the determination is a first determination, and further comprising selecting one or more adult-suitable features for the interface based at least partly on a second determination that the hand is associated with the adult.

* * * * *